United States Patent [19]

Brown et al.

[11] 3,951,822

[45] Apr. 20, 1976

[54] FIRE RETARDANT COMPOSITION FOR URETHANE POLYMERS

[75] Inventors: Jasper H. Brown, East Alton; Albert W. Morgan, Collinsville, both of Ill.; John A. Cooper, Manchester, Mo.

[73] Assignee: Monsanto Company, St. Louis, Mo.

[22] Filed: Nov. 18, 1974

[21] Appl. No.: 524,582

[52] U.S. Cl. .............................. 252/8.1; 260/2.5 AJ; 428/921
[51] Int. Cl.² ............................................. C09K 3/28
[58] Field of Search ................... 252/8.1; 260/2.5 AJ

[56] References Cited
UNITED STATES PATENTS 3,740,264   6/1973   Lynch et al. ......................... 252/8.1

FOREIGN PATENTS OR APPLICATIONS 234,556   12/1959   Australia ......................... 260/2.5 AJ Primary Examiner—Leland A. Sebastian
Attorney, Agent, or Firm—Robert E. Wexler

[57] ABSTRACT

A composition comprising a metal salt of a carboxylic acid in conjunction with a beta-haloethyl phosphate has been found useful as a flame retardant for urethane polymers and composites thereof with other polymer materials. The zinc, antimony, stannic and cupric salts of such acids are used in combination with, e.g., tris(beta-chloroethyl) phosphate.

12 Claims, No Drawings

FIRE RETARDANT COMPOSITION FOR URETHANE POLYMERS

BACKGROUND OF THE INVENTION

In the preparation of polyurethane foam carpeting underlayment composites, a widely used composite comprises a polyurethane foam which has been coated on one side with a polyolefin film which acts as a slip surface to allow the carpet to be easily stretched over the underlay. The polyolefin is normally in contact with the undersurface of the carpet. If the carpeting catches fire, the polyolefin component of the underlayment composite acts as a fuel to spread the fire throughout the carpet and underlayment material. Since flame retardants are, in general, incompatible with polyolefins, it has been found necessary to provide other means for flame retarding the carpet underlayment material other than by flame retarding the polyolefin component. Accordingly, the main objective of this invention is to provide a flame retardant composition which, when added to the polyurethane component of a polyurethane/polyolefin composite carpet underlay, acts to prevent or retard flammability of the polyolefin component.

SUMMARY

In accordance with the present invention, it has been found that if an organo-metallic material and a beta-haloethyl phosphate, which decomposes to provide a volatile halide, are incorporated in the polyurethane component of a polyurethane/polyolefin underlayment composite, the halogen volatilizing from the beta-haloethyl phosphate acts to reduce the flammability of the polyolefin component. Additionally, it has been found that beta-haloethyl phosphate esters act to enhance the action of the organo-metallic materials and thereby provide increased flame retardance for the underlay. It has further been found that nonhalogenated phosphate esters may also be incorporated in the flame retardant composition of the present invention so that the flame retardant composition will thereby be more easily blended into the polyurethane material.

It has thus been found that zinc, antimonic, stannic and cupric salts of organic acids in combination with beta-haloethyl phosphates act as an enhanced flame retardant composition.

The organic acid salts which form one component of the flame retardant composition of the present invention comprise the zinc, stannic, cupric and antimonic salts of organic carboxylic acids having from 1 to about 18 carbon atoms. Exemplary acids which react with the described metals to form salts include formic, acetic propionic, butyric, valeric, caproic, heptoic, caprylic, pelargonic, capric, lauric, isoacetic, palmitic, margaric, stearic; acrylic, crotonic, oleic; oxalic, malonic, succinic, glutaric, adipic, pimelic, suberic, azelaic, sebacic, glutaconic, maleic, fumaric, citraconic; benzoic, phenylacetic, toluic, dihydrocinnamic; phthalic, diphenic; cinnamic and benzalpropionic.

The metal salts are prepared by methods well known in the art, such as by addition of the metal carbonate to an acid solution or by titration of the appropriate organic acid solution with the appropriate metal hydroxide.

The second component of the flame retardant composition of the invention is a beta-haloethyl phosphate, i.e., simple and complex phosphates containing a beta-haloethyl group, e.g. a mono-, di- or tri-phosphate wherein at least one ester group contains a beta-haloethyl moiety, i.e. the radical $-CH_2CH_2X$, wherein X represents halogen such as chlorine or bromine. The beta-haloethyl phosphates may be simple phosphates or may be complex, i.e., bisphosphates, polymers and the like. Simple beta-haloethyl phosphates include diphenyl beta-chloroethyl phosphate, diisodecyl beta-chloroethyl phosphate, di-2-ethylhexyl beta-chloroethyl phosphate, dicresyl beta-chloroethyl phosphate, diisooctyl beta-chloroethyl phosphate, di-tributoxyethyl betachloroethyl phosphate, dibutyl beta-chloroethyl phosphate, diisooctyl beta-chloroethyl phosphate, isooctyl bis(beta-chloroethyl) phosphate, tris(-beta-chloroethyl) phosphate, dicresyl beta-bromoethyl phosphate, diphenyl beta-bromoethyl phosphate, di-2-ethylhexyl beta-bromoethyl phosphate, tris(beta-bromoethyl) phosphate, beta-haloethyl phosphates prepared from 7, 9 or 11 carbon atom alcohols or mixtures thereof, e.g. deheptyl beta-chloroethyl phosphate, dinonyl beta-chloroethyl phosphate, diundecyl betachloroethyl phosphate, di-$C_{7,9,11}$ beta-chloroethyl phosphate, heptyl bis(beta-bromoethyl) phosphate, nonyl bis(beta-bromoethyl) phosphate, undecyl bis(-beta-bromoethyl) phosphate, $C_{7,9,11}$ bis (beta-bromoethyl) phosphate and similar materials.

Complex phosphates utilized herein include compounds set out in formula II of U.S. Pat. No. 3,192,242, e.g., 2,2-bis(chloromethyl) trimethylene bis-[di(2-chloroethyl) phosphate] and the bis and polyphosphates set forth at column 1, lines 32 through 40 of U.S. Pat. No. 3,014,956, and particularly the phosphate set forth at column 28, lines 62 through 65 thereof.

Additionally, the composition of the invention may optionally contain non-halogenated phosphate esters such as isodecyl diphenyl phosphate, 2-ethylhexyl diphenyl phosphate, 2-ethylhexyl dicresyl phosphate, isooctyl diphenyl phosphate, tributoxyethyl phosphate, tributyl phosphate, tricresyl phosphate, triphenyl phosphate, t-butyl diphenyl phosphate, m-ethylphenyl diphenyl phosphate, isopropylphenyl diphenyl phosphate, diisopropyl phenyl phosphate, triisopropyl phosphate.

The amount of the flame retardant composition which is added to the urethane polymer is from about 2 to about 25 phr (parts per hundred resin) total flame retardant, preferably from about 5 to about 15 phr. Particularly preferred is a flame retardant concentration of from about 5.5 to about 11 phr.

The metal salt is normally added in an amount of from about 0.1 to about 1.5 phr, preferably from about 0.1 to about 1.0 phr.

The beta-haloethyl phosphate is normally added in an amount of from about 4 to about 20 phr, preferably from about 5 to about 10 phr.

In the flame retardant composition itself, the ratio of acid salt to beta-haloethyl phosphate is from about 1:10 to about 1:55, preferably from about 1:10 to about 1:20.

Of course, the non-halogenated phosphate ester may be added in an amount of from about 10–300 percent, based on the amount of salt. Normally the non-halogenated phosphate is used in an amount of about 100 percent of the amount of salt.

The flame retardant composition may be added to the urethane polymer by separate metering into the mixing head or by dissolving the flame retardant in a polyol, silicone fluid or another flame retardant or other component.

The urethane polymers which are contemplated in accordance with the present invention are polyether polyols from ethylene oxide, propylene oxide, tetrahydrofuran and copolymers reacted with toluene diisocyanate, polymeric isocyanates, 4,4'-diphenylmethane diisocyanate or aliphatic diisocyanates, water, blowing agents, surfactants and curatives as is well known in the art. Polyester polyols prepared from di- or tri-basic acids may be used in lieu of polyether polyols.

Particularly preferred are urethane polymers which have been foamed.

The following examples will illustrate specific embodiments of the invention contemplated by applicants and are not to be considered a limitation thereof.

EXAMPLE 1

This example illustrates results obtained by testing the flammability characteristics of a polyethylene/foamed polyurethane laminate.

The test laminate is prepared by thermally laminating a 1–4 mil low density polyethylene film to a polyether/polyurethane foam having a density of 1.8 to 2.6 pounds per cubic foot and a thickness of one-half inch to three-fourths inch. The completed laminate is useful as a carpet underlay.

The polyurethane described above is prepared as follows:

| Ingredients | Weight (Grams) |
|---|---|
| POLYOL GP-3030* | 100.00 |
| Water | 4.00 |
| Triethylene diamine | .65 |
| Silicone | 1.00 |
| Tolylene diisocyanate | 54.00 |
| Stannous octoate catalyst | .16 |

*Polyether Polyol manufactured by Wyandotte Chemical Co.

To replicate samples of the above formulation there are added various flame retardants and metal salts. The flame retarded polyurethane is then foamed and thermally laminated to the above-described polyethylene film to form a composite which is then tested for flame retardant properties.

The test is conducted in accordance with DOC FF 2-70 which provides a method to determine the surface flammability of small carpets and rugs when exposed to a standard source of ignition under carefully prescribed draft-protected conditions. The method involves the exposure of each of 8 conditioned, replicate specimens of a small carpet or rug to a standard igniting source in a draft-protected environment and measurement of the proximity of the charred portion of the sample to the edge of the hole in a prescribed flattening frame. A specimen passes the test if the charred portion does not extend to within 2.54 centimeters of the edge of the hole in the flattening frame at any point. In order to conform to the standard, at least 7 of the 8 specimens must meet the test criteria.

In general, the test involves placing an approximately 22.9 centimeter square specimen of a small carpet or rug in a test chamber. On the specimen there is placed a methenamine tablet on a point corresponding to the center of the hole (diameter = 22.8 cm) in the flattening frame. The tablet is ignited by touching a lighted match or equivalent igniting source carefully to its top. The test is continued until the last vestige of flame or glow disappears or until the flaming or smoldering has approached within 2.54 centimeters of the edge of the hole (having a diameter of 22.8 cm) in the flattening frame at any point. When all combustion has ceased, the test chamber is ventilated and the shortest distance between the edge of the hole in the flattening frame and the charred area is measured and recorded. If the charred area does not extend to within 2.54 centimeters of the edge of the hole in the flattening frame at any point, the carpet or rug meets the acceptance criteria. This test is more specifically described in the Federal Register, Volume 35, No. 74, page 6,213.

Accordingly, the laminate described above is tested. The various replicate groups of laminates are flame retarded with the materials shown in the Table below. The test results are shown with relation to the diameter of the burned hole.

TABLE

| Flame Retardant | Parts per hundred of resin | | | | | | | | |
|---|---|---|---|---|---|---|---|---|---|
| PHOSGARD 2XC20[1] | 6 | 6 | 6 | — | — | — | — | — | — |
| FIREMASTER T-23-P[2] | — | — | — | 6 | 6 | 6 | — | — | — |
| FYROL FR-2[3] | — | — | — | — | — | — | 6 | 6 | 6 |
| Zinc Octoate | — | .6 | — | — | .6 | — | — | .6 | — |
| Zinc Oleate | — | — | .6 | — | — | .6 | — | — | .6 |
| Diameter of Burn (centimeters) | 8.9 B | 7.7 | 7.1 | 8.9 B | 6.4 | 9.7 | B | B | B |

[1]Trademark of Monsanto Company. 2,2-Bis-(chloromethyl) trimethylene bis-[di(2-chloroethyl) phosphate].
[2]Trademark of Michigan Chemical Co. Tris(2,3-dibromopropyl) phosphate.
[3]Trademark of Stauffer Chemical Co. Tris(dichloropropyl) phosphate.

Of the three fire retardant materials used, only PHOSGARD 2XC20 contains a beta-haloethyl group, i.e. betachloroethyl.

The test data are interpreted as follows:
1. A whole number indicates the distance across the hole burned in the laminate.
2. A fraction indicates the distance across the hole in the polyurethane (numerator) and indicates that the polyethylene continued to burn after the polyurethane extinguished. Thus, the whole number 2 would indicate that the laminate, after extinguishing, had a burn hole 2 centimeters in diameter. A fraction such as 2/B would indicate that the polyethylene continued to burn after the polyurethane extinguished leaving a burn hole 2 centimeters in diameter.
3. The designation B, by itself, indicates that the laminate burns.

The above data show that flame retardance of PHOSGARD 2XC20 is improved by the addition of metal salt; that tris(2,3-dibromopropyl) phosphate shows no improvement, and actually performs worse, with the addition of metal salt; that tris(2,3-dichloropropyl) phosphate fails in all instances.

Combinations of beta-haloethyl phosphates and metal salts of acids such as zinc formate, zinc stearate, stannic butyrate, cupric caproate, antimonic laurate, zinc palmitate, antimonic stearate, cupric oleate, zinc sebacate, stannic benzoate, cupric phthalate with diisodecyl beta-chloroethyl phosphate, di-2-ethylhexyl beta-bromoethyl phosphate, dicresyl beta-chloroethyl phosphate provide like results.

EXAMPLE 2

Laminates prepared as in Example 1 are retested but a replicate group of samples is formulated which contain an optional non-halogenated phosphate as part of the flame retardant formulation. The non-halogenated phosphate, isodecyl diphenyl phosphate assists the work-up of the zinc salt into the polyurethane foam.

Results are shown in the Table below:

| Flame Retardant | Sample No. | | | | | |
|---|---|---|---|---|---|---|
| | 1 | 2 | 3 | 4 | 5 | 6 |
| FYROL FR-2 | — | — | 10 | 10 | — | — |
| PHOSGARD 2XC20 | 10 | 10 | — | — | 10 | 10 |
| Zinc Oleate | — | .5 | — | .5 | — | — |
| Zinc Octoate | — | — | — | — | — | .5 |
| Isodecyl Diphenyl Phosphate | — | .5 | — | .5 | .5 | .5 |
| Diameter (Centimeters) | 6.1 | 5.1 | 7.6 | 8.9 | 5.8 | 5.1 |

The data show:
1. Tris(dichloropropyl) phosphate performs worse with the addition of metal salt even at this increased concentration.
2. Performance of the phosphate containing a beta-chloroethyl group is improved by addition of metal salt and/or a non-halogenated phosphate ester.

While the invention has been described by referring to certain specific embodiments, it is not so limited since many modifications and variations are possible in the light of the above teachings. The invention may therefore be practiced otherwise than as specifically described without departing from the spirit and scope thereof.

What is claimed is:

1. A flame retardant composition comprising a salt of a carboxylic acid and a metal selected from zinc, antimony, tin and copper and a beta-haloethyl phosphate.
2. Composition of claim 1 wherein said metal is zinc.
3. Composition of claim 1 wherein said metal is antimony.
4. Composition of claim 1 wherein said metal is tin.
5. Composition of claim 1 wherein said metal is copper.
6. Composition of claim 1 wherein said acid contains from 1 to about 18 carbon atoms.
7. Composition of claim 1 wherein said phosphate is a beta-bromoethyl phosphate.
8. Composition of claim 1 wherein said phosphate is a beta-chloroethyl phosphate.
9. Composition of claim 1 which contains a non-halogenated phosphate.
10. Composition of claim 9 wherein said phosphate is isodecyl diphenyl phosphate.
11. Composition of claim 1 wherein said acid salt is selected from zinc octoate, zinc oleate and zinc stearate and said phosphate is 2,2-bis(chloromethyl) trimethylene bis[di(2-chloroethyl) phosphate].
12. Composition of claim 1 wherein the ratio of said salt to said phosphate is from about 1:10 to about 1:55.

* * * * *